(12) United States Patent
Meschke et al.

(10) Patent No.: US 12,490,679 B2
(45) Date of Patent: Dec. 9, 2025

(54) COMBINE HARVESTER SEPARATION SYSTEM

(71) Applicant: DEERE & COMPANY, Moline, IL (US)

(72) Inventors: Michael T. Meschke, Eldridge, IA (US); Michael L Vandeven, Leclaire, IA (US); Brian Gorge, Colona, IL (US); Martin Rittershofer, Zweibrücken (DE)

(73) Assignee: Deere & Company, Moline, IL (US)

( * ) Notice: Subject to any disclaimer, the term of this patent is extended or adjusted under 35 U.S.C. 154(b) by 667 days.

(21) Appl. No.: 17/823,766

(22) Filed: Aug. 31, 2022

(65) Prior Publication Data
US 2024/0065171 A1 Feb. 29, 2024

(51) Int. Cl.
A01F 12/26 (2006.01)
A01F 7/06 (2006.01)
A01F 12/28 (2006.01)

(52) U.S. Cl.
CPC .............. A01F 12/26 (2013.01); A01F 7/06 (2013.01); A01F 12/28 (2013.01)

(58) Field of Classification Search
CPC .......... A01F 7/067; A01F 12/26; A01F 12/28; A01F 7/06; A01D 41/1276
See application file for complete search history.

(56) References Cited

U.S. PATENT DOCUMENTS

| | | | |
|---|---|---|---|
| 3,537,459 A | 11/1970 | Thomas | |
| 3,631,862 A | 1/1972 | Rowland-Hill | |
| 4,259,829 A | 4/1981 | Strubbe | |
| 4,968,284 A | 11/1990 | Klimmer et al. | |
| 5,338,257 A | 8/1994 | Underwood | |
| 6,802,771 B2 | 10/2004 | Schwersmann et al. | |
| 6,932,697 B2 | 8/2005 | Baumgarten et al. | |
| 7,153,204 B2 | 12/2006 | Esken et al. | |
| 7,771,260 B2 | 8/2010 | Ricketts et al. | |
| 8,118,649 B1 | 2/2012 | Murray et al. | |
| 8,133,100 B2 | 3/2012 | Regier et al. | |
| 9,155,249 B2 | 10/2015 | Baumgarten et al. | |
| 9,345,197 B2 | 5/2016 | Biggerstaff et al. | |

(Continued)

FOREIGN PATENT DOCUMENTS

| | | |
|---|---|---|
| BR | 102020018945 A2 | 3/2022 |
| CN | 104855058 A | 8/2015 |

(Continued)

OTHER PUBLICATIONS

MDW Ernte Meister 527 STS, pp. 1-3, [online]. Retrieved from the Internet <URL: https://www.youtube.com/watch?v=bf8-ElVMoW8&list=PLpTnMYmC5HYd9iBvByjvIUTFDzmgKKpvv&t=63s>.

(Continued)

Primary Examiner — Alicia Torres
Assistant Examiner — Douglas J Meislahn

(57) ABSTRACT

Combine harvesters may include crop processing systems having a grate subassemblies with flaps that, in some instances, are divided into groups that are independently movable and moveable in opposite directions between a fully open position and a fully closed position. Further, each of the grate assemblies may include an actuator that is operable to actuate simultaneously a portion of the flaps on each of the grate assemblies.

16 Claims, 14 Drawing Sheets

(56) References Cited

U.S. PATENT DOCUMENTS

| | | |
|---|---|---|
| 9,445,546 B2 | 9/2016 | May |
| 9,763,390 B2 | 9/2017 | Matway et al. |
| 10,045,487 B1 | 8/2018 | Robertson |
| 10,104,840 B2 | 10/2018 | Duquesne et al. |
| 10,342,178 B2 | 7/2019 | Bussmann et al. |
| 10,785,916 B2 | 9/2020 | Robertson |
| D901,546 S | 11/2020 | Robertson |
| 10,869,427 B2 | 12/2020 | Robertson |
| 10,905,050 B2 | 2/2021 | Robertson |
| 11,116,136 B2 | 9/2021 | Robertson |
| 11,122,743 B2 | 9/2021 | Robertson |
| 11,191,215 B1 | 12/2021 | Robertson |
| 2002/0145336 A1* | 10/2002 | Bottom ................. F16C 11/045 305/202 |
| 2008/0194306 A1 | 8/2008 | Ricketts et al. |
| 2014/0335923 A1 | 11/2014 | Biggerstaff et al. |
| 2015/0156971 A1 | 6/2015 | May |
| 2017/0196169 A1 | 7/2017 | Duquesne et al. |
| 2019/0387681 A1 | 12/2019 | Theisen et al. |
| 2020/0196530 A1* | 6/2020 | Van Hullebusch ..... A01F 12/26 |
| 2020/0253126 A1 | 8/2020 | Robertson |
| 2021/0015048 A1 | 1/2021 | Kile |
| 2021/0084818 A1 | 3/2021 | Poelling et al. |
| 2021/0311485 A1 | 10/2021 | Borgstadt |
| 2023/0157212 A1* | 5/2023 | Jung ....................... A01F 12/26 460/109 |
| 2023/0329151 A1* | 10/2023 | Zollondz ................ A01F 12/34 |
| 2024/0049645 A1* | 2/2024 | Herbst .................... A01F 12/28 |
| 2024/0298579 A1* | 9/2024 | Theisen .................. A01F 12/26 |
| 2024/0407299 A1* | 12/2024 | Calmer ................ A01F 12/184 |

FOREIGN PATENT DOCUMENTS

| | | | |
|---|---|---|---|
| CN | 207040270 U | 2/2018 | |
| CN | 110149917 A | 8/2019 | |
| CN | 209218663 U | 8/2019 | |
| CN | 112369214 A | * 2/2021 | ............ A01F 12/24 |
| DE | 3832996 A1 | 4/1989 | |
| DE | 19525244 C2 | 11/2003 | |
| DE | 102011051215 A1 | 12/2012 | |
| EP | 1479280 A1 | 11/2004 | |
| EP | 1284098 B1 | 11/2006 | |
| EP | 1449425 B1 | 9/2008 | |
| EP | 2537404 B1 | 6/2017 | |
| JP | 2017051108 A | 3/2017 | |
| RU | 189040 U1 | 5/2019 | |

OTHER PUBLICATIONS

CH770 New Holland Combine Harvesters-Balers-Accompanying Tools, Jul. 2020, pp. 1-28.

Screen captures from YouTube video clip entitled "Claas Trion and Tucano combine harvesters (manual locking mechanism)" 3 pages, uploaded on Jun. 23, 2022. Retrieved from Internet: <https://www.youtube.com/watch?v=wZBArqFl_yc&t=42s>.

* cited by examiner

COMBINE HARVESTER SEPARATION SYSTEM

FIELD OF THE DISCLOSURE

The present disclosure relates generally to crop processing systems and, more particularly, to crop processing systems of an agricultural harvester.

BACKGROUND OF THE DISCLOSURE

Crop processing systems (also referred to as threshing and separation systems) of combine harvesters operate to process incoming crop to remove grain from material other than grain ("MOG"). Generally, crop processing systems include one or more rotors and concaves that cooperate to thresh incoming crop material to remove the grain from the MOG. The threshing and separation systems may also include separation grates that operate to release the separated grain from the MOG where the released grain is subsequently processed to further clean the released grain.

SUMMARY OF THE DISCLOSURE

An aspect of the present disclosure is directed to a grate assembly of a crop processing system for an agricultural machine. The grate assembly may include a grate configured to be disposed adjacent to a rotor, a plurality of flaps pivotably coupled to the grate, and a movable linkage. The grate may include a first sidewall, a second sidewall offset from the first sidewall, and an opening defined between the first sidewall and the second sidewall. Each flap of the plurality of flaps may include a first end, a second end disposed opposite the first end, a leading end; and a trailing end freely extending from the leading end. The first end may be disposed adjacent to the first sidewall of the grate. Each flap of the plurality of flaps may be pivotable about an axis passing along the leading end. The movable linkage may be disposed between the at least a portion of the first ends of the plurality of flaps and the first sidewall. The movable linkage may be coupled to at least one of the flaps of the plurality of flaps. The movable linkage may be movable between a first position and a second position to pivot the at least one of the flaps of the plurality of flaps over an angular range. The grate assembly may also include a space deposed between the movable linkage and the first sidewall and be free of a trailing end of any flap.

Another aspect of the present disclosure is directed to a combine harvester. The combine harvester may include a body, traction control components configured to transport the body over the ground, and a crop processing system disposed in the body. The processing system may include a first rotor rotatable about a first longitudinal axis and a grate assembly disposed adjacent to the first rotor and operable, in cooperation with the first rotor, to process harvested crop material. The grate assembly may include a first grate, a plurality of flaps pivotably coupled to the first grate, and a movable linkage. The first grate may include a first sidewall, a second sidewall offset from the first sidewall, and an opening defined between the first sidewall and the second sidewall. Each flap of the plurality of flaps may include a first end, a second end disposed opposite the first end, a leading end, and a trailing end extending from the leading end. The first end may be disposed adjacent to the first sidewall of the grate. The flap may be pivotable about an axis passing along the leading end. The movable linkage may be disposed between the at least a portion of the first ends of the plurality of flaps and the first sidewall. The movable linkage may be coupled to at least one of the flaps of the plurality of flaps. The movable linkage may be movable between a first position and a second position to pivot the at least one of the flaps of the plurality of flaps over an angular range. The grate assembly may also include a space deposed between the movable linkage and the first sidewall being free of a trailing end of any flap.

The various aspects may include one or more of the following features. The plurality of flaps may extend between the first sidewall and the second sidewall. A plurality of crossbars may extend through the opening between the first sidewall and the second sidewall. The plurality of crossbars may be distributed along a length of the first sidewall and the second sidewall. The leading end of each of the plurality of flaps may be pivotably coupled at an end of a respective crossbar of the plurality of crossbars. At least one of the plurality of crossbars may include a recess, and an end of the flap of the plurality of flaps corresponding to the at least one crossbar that includes the recess may nest in the recess. At least one of the plurality of flaps comprises a tab, and the movable linkage may be pivotably coupled to the tab. A pivot pin may extend along the pivot axis. The pivot pin may include a head. A flap of the plurality of flaps may be pivotable on the pivot pin about the axis. At least one of the first sidewall and the second sidewall may include an opening, and the head of the pivot pin may be received into the opening to form an interference fit. The first sidewall and the second sidewall may define a curvature. The plurality of flaps may be pivotably coupled to the first sidewall and the second sidewall. The grate may include one of a separator grate and a concave grate. The grate may include a first grate, and the movable linkage may be configured to pivotably coupled to at least one flap pivotably coupled to a second grate.

The various aspects may include one or more of the following features. The plurality of flaps may extend between the first sidewall and the second sidewall. A plurality of crossbars may extend through the opening between the first sidewall and the second sidewall. The plurality of crossbars may be distributed along a length of the first sidewall and the second sidewall. The leading end of each of the plurality of flaps may be pivotably coupled at an end of a respective crossbar of the plurality of crossbars. At least one of the plurality of crossbars may include a recess, and an end of the of the plurality of flaps corresponding to the at least one crossbar that includes the recess may nest in the recess. At least one of the plurality of flaps may include a tab, and the movable linkage may be pivotably coupled to the tab. A pivot pin may extend along the pivot axis, and the pivot pin may include a head. A flap of the plurality of flaps may be pivotable on the pivot pin about the axis. At least one of the first sidewall and the second sidewall may include an opening, and the head of the pivot pin may be received into the opening to form an interference fit. The first sidewall and the second sidewall may define a curvature. The plurality of flaps may be pivotably coupled to the first sidewall and the second sidewall. The first grate may include one of a separator grate and a concave grate. A second rotor may also be included. The plurality of flaps may include a plurality of first flaps. The grate assembly may also include a second grate disposed adjacent to the second rotor and a plurality of second flaps pivotably coupled to the second grate. The movable linkage may be pivotably coupled to at least one flap of the plurality of second flaps to simultaneously pivot at least one of the first flaps and the at least one of the second flaps.

Other features and aspects will become apparent by consideration of the detailed description and accompanying drawings.

BRIEF DESCRIPTION OF THE DRAWINGS

The detailed description of the drawings refers to the accompanying figures in which.

DETAILED DESCRIPTION

Figure 1:
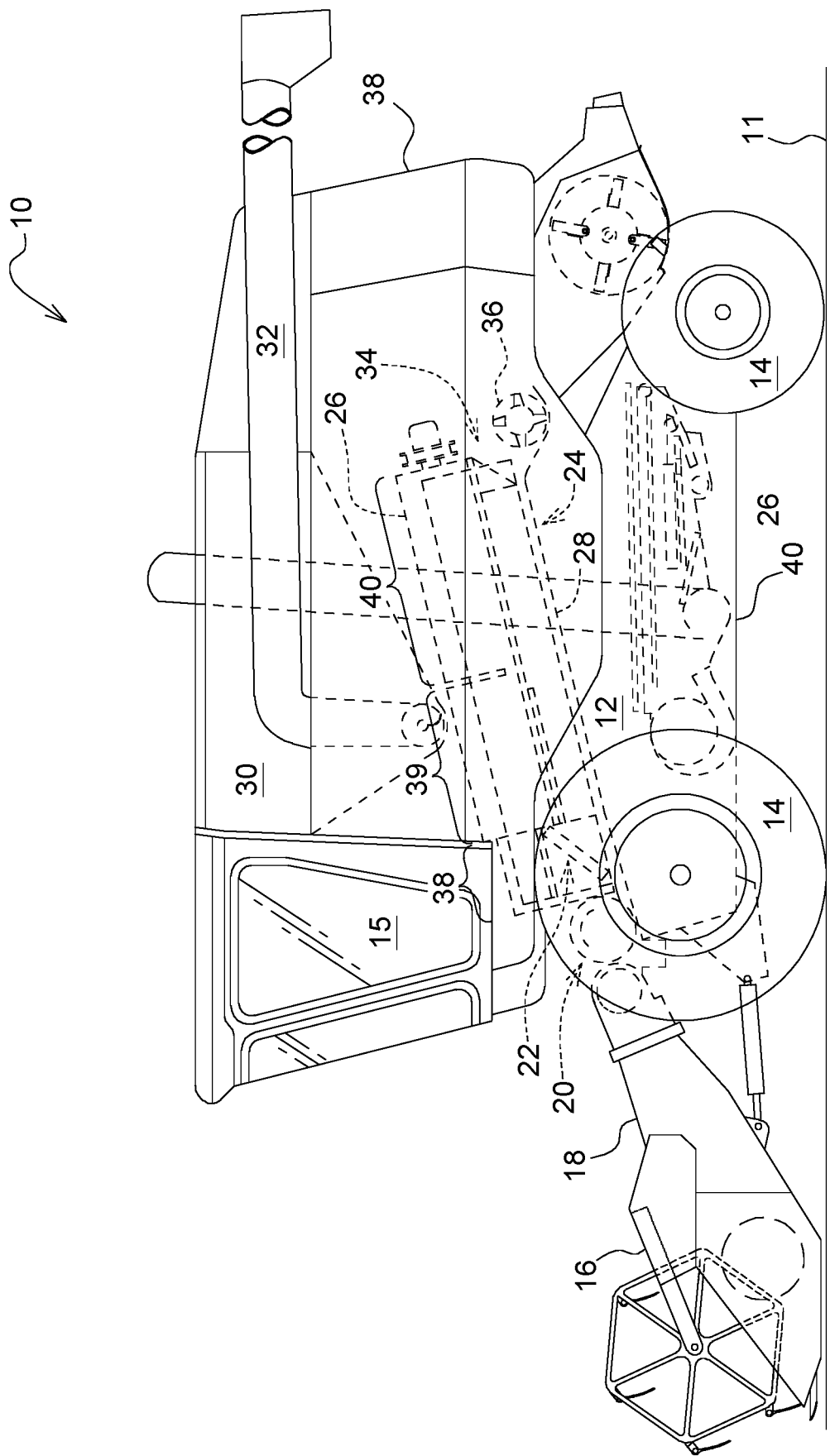
FIG. 1 is a is a diagrammatic side view of an example agricultural combine according to some implementations of the present disclosure.

For the purposes of promoting an understanding of the principles of the present disclosure, reference will now be made to the implementations illustrated in the drawings, and specific language will be used to describe the same. It will nevertheless be understood that no limitation of the scope of the disclosure is intended. Any alterations and further modifications to the described devices, systems, or methods and any further application of the principles of the present disclosure are fully contemplated as would normally occur to one skilled in the art to which the disclosure relates. In particular, it is fully contemplated that the features, components, and/or steps described with respect to one implementation may be combined with the features, components, and/or steps described with respect to other implementations of the present disclosure.

Words of orientation, such as "up," "down," "top," "bottom," "above," "below," "leading," "trailing," "front," "back," "forward," and "rearward," are used in the context of the illustrated examples as would be understood by one skilled in the art and are not intended to be limiting to the disclosure. For example, for a particular type of vehicle or implement in a conventional configuration and orientation, one skilled in the art would understand these terms as the terms apply to the particular vehicle or implement.

For example, as used herein, with respect to a work vehicle (e.g., a combine harvester), unless otherwise defined or limited, the term "forward" (and the like) corresponds to a forward direction of travel of the work vehicle over the ground during normal operation of the work vehicle. Likewise, the term "rearward" (and the like) corresponds to a direction opposite the forward direction of travel of the work vehicle.

Also as used herein, with respect to an implement or components thereof (which includes headers), unless otherwise defined or limited, the term "leading" (and the like) indicates a direction of travel of the implement during normal operation (e.g., the forward direction of travel of a work vehicle transporting an implement). Similarly, the term "trailing" (and the like) indicates a direction that is opposite the leading direction.

The present disclosure is directed to crop processing systems, such as crop processing systems for agricultural combine harvesters. Crop systems of the present disclosure encompass systems having dual rotors with separation grates, whether part of a concave or part of separator, having reduced associated costs along with increased performance and ease of interface.

FIG. 1 is a schematical side view of an example agricultural combine 10 that includes a supporting structure 12 having ground engaging components 14 (wheels 14) coupled to the supporting structure 12. In the illustrated example, the ground engaging components 14 are wheels that operate to transport the combine 10 across the ground 11. In other instances, the ground engaging components 14 may include one or more tracks to transport the combine 10 over the ground 11. In still other implementations, other types of ground engaging components may be used to transport the combine 10 across the ground 11.

The combine 10 also includes a cab 15 that includes controls for operating the combine 10. An operator present in the cab 15 utilizes the controls to control operation of the combine 10. An agricultural implement 16 is attached to the combine 10 at a feederhouse 18 thereof. The agricultural implement 16 is used to harvest a crop and to direct the harvested crop to the feederhouse 18. Example agricultural implements include a corn header or a draper header. The agricultural implement 16 also encompasses other headers. The harvested crop is directed by the feederhouse 18 to a beater 20. The beater 20 directs the harvested crop through an inlet transition section 22 to the axial crop processing system 24.

The crop processing system 24 includes one or more rotors 26 and one or more concaves 27, grates 28, or both located adjacent to the one or more rotors 26. The one or more rotors 26 are oriented longitudinally along a length of the combine 10 and cooperate with the one or more concaves and grates 28 to thresh and separate the harvested crop to produce grain, chaff, and straw. Grain and chaff produced during operation of the crop processing system 24 falls through the concaves 27 and grates 28 provided at a bottom of the crop processing system 24 and into a cleaning system 26. The cleaning system 26 removes the chaff and directs clean grain to a clean grain elevator (not shown). The clean grain elevator deposits the clean grain in grain tank 30. The clean grain in the grain tank 30 can be unloaded from the combine 10, such as into a grain cart or truck, via an unloading auger 32. Straw from the harvested crop material is discharged from the crop processing system 24 through an outlet 34 to discharge beater 36. The discharge beater 36, in turn, propels the straw from an end portion 38 of the combine 10.

Figure 2:
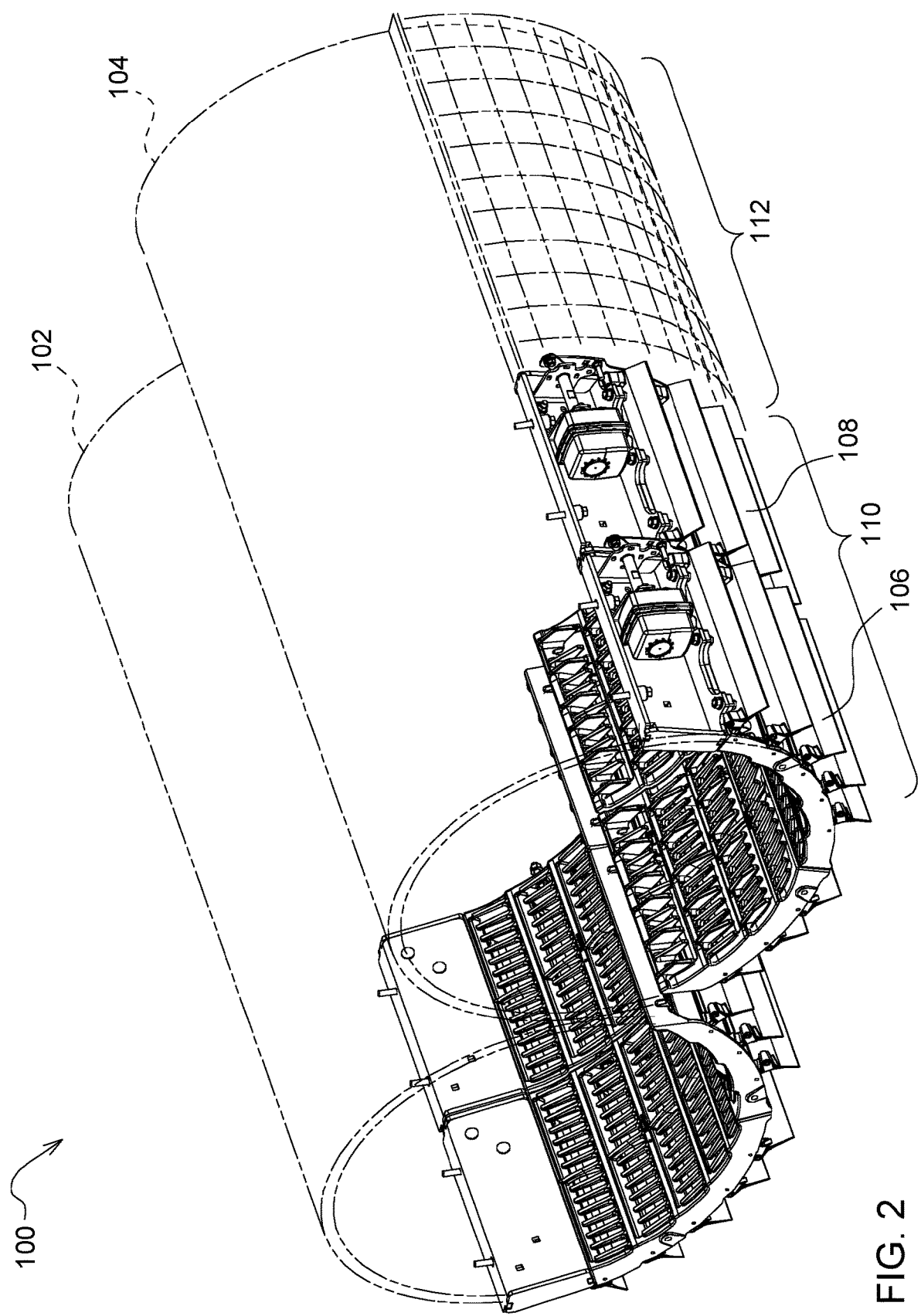
FIG. 2 is an oblique view of an example crop processing system, according to some implementations of the present disclosure.

FIG. 2 is an oblique view of a portion of an example crop processing system 100 that may be similar to the crop processing system 24, described above. The crop processing system 100 includes a first rotor 102 and a second rotor 104 disposed adjacent to each other. The crop processing system 100 also includes grate assemblies 106 and 108 disposed adjacent to the first and second rotors 102 and 104. Although two grate assemblies are illustrated, the crop processing system 10 may include additional or fewer grate assemblies. Further, the grate assemblies 106 and 108 are provided in a separating portion 110 of the crop processing system 100. In other implementations, one or more grate assemblies may be included in a threshing portion 112 of the crop processing system 100. For example, one or more grate assemblies may be included with or form part of a concave. The rotors 102 and 104, in combination with the grate assemblies 106 and 108, operate to separate grain from the harvested crop material.

Figure 3:
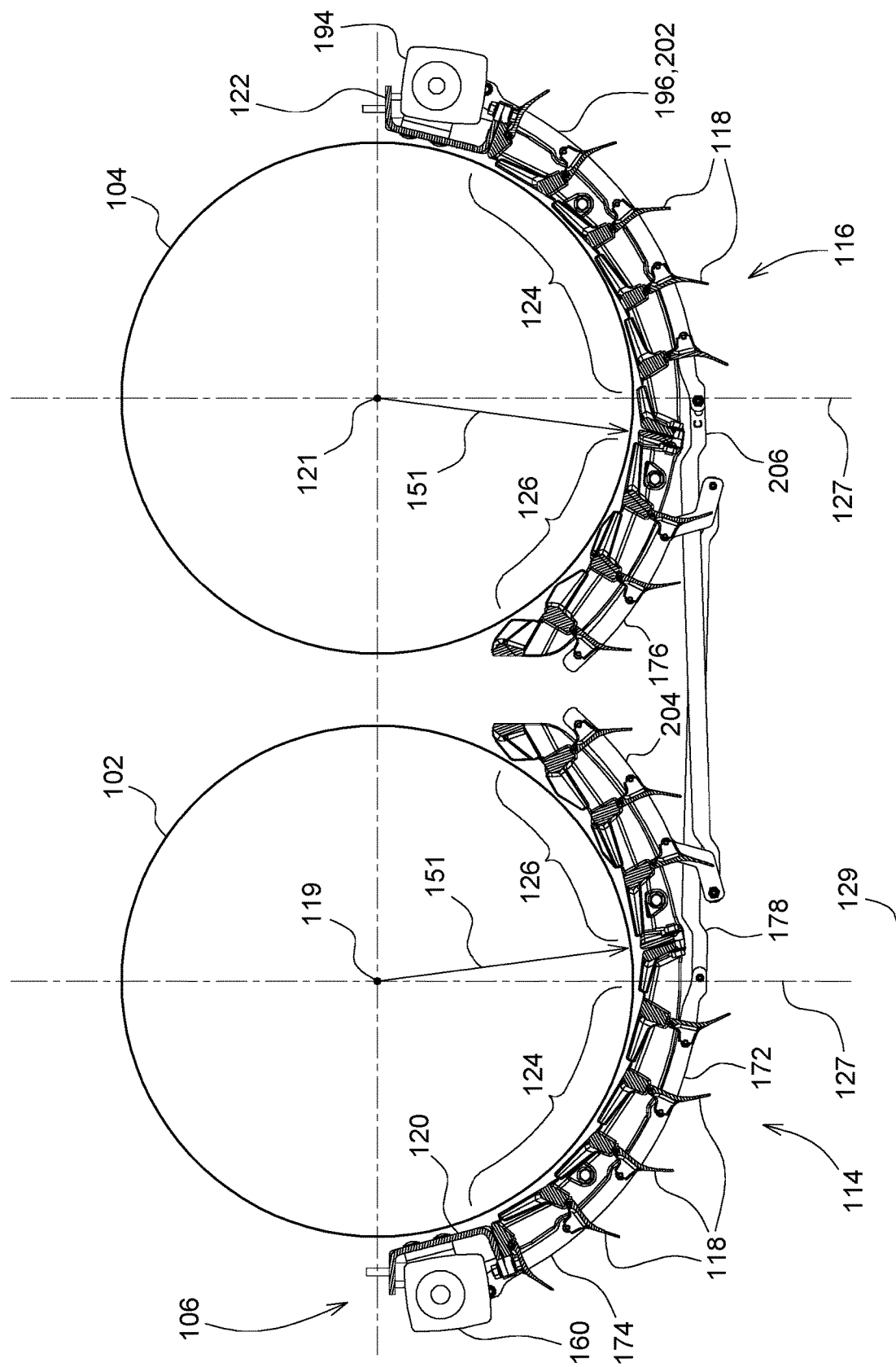
FIG. 3 is an end view of the crop processing system of FIG. 2.

FIG. 3 is a rear view of the grate assembly 106 and is representative of grate assembly 108. The grate assembly 106 includes a first grate subassembly 114 and a second grate subassembly 116 laterally adjacent to each other. The first rotor 102 is located adjacent to the first grate assembly 114, and a second rotor 104 is located adjacent to the second grate assembly 116. The first rotor 102 defines a first longitudinal axis 119 about which the first rotor 102 rotates. The second rotor 104 defines a second longitudinal axis 121 about which the second rotor 104 rotates. The grate assemblies 114 and 116 and respective rotors 102 and 104 cooperate to thresh or separate harvested crop material. A grate 120 of the grate assembly 114 is curved and, in some instances, conforms to the cylindrical shape of the first rotor 102. Similarly, a grate 122 of the grate assembly 116 is curved and, in some instances, conforms to the cylindrical shape of the second rotor 104. The first and second rotors 102 and 104 nest within the curvature of the grate 120 of the first grate assembly 114 and the grate 122 of the second grate assembly 116, respectively. In this way, the conforming shapes of the grate assemblies 114 and 116 and the close proximity of the grate assemblies 114 and 116 to the respective rotors 102 and 104 provide for threshing or separating of harvested crop material.

As indicated above, the grate subassemblies 114 and 116 include respective grates 120 and 122 with a plurality of flaps 118 provided pivotably movable thereon. The flaps 118 provided on each of the grates 120 and 122 are divided into two groups, a first group 124 and a second group 126. The first and second groups 124 and 126 are divided by a vertical line 127 passing through the longitudinal axes 119 and 121 of the respective rotors 102 and 104 such as when the combine harvester containing the crop processing system 100 is located on level ground 129. In some implementations, with the combine harvester provided on level ground 129 and where the crop processing system 100 is symmetrical as shown in FIGS. 2 and 3, the longitudinal axes 119 and 121 of the respective rotors 102 and 104 are laterally aligned. Further, with the combine harvester in this orientation, i.e., positioned on the level ground 129, the vertical lines 127 are disposed perpendicularly to the level ground 129 or a plane representing the level ground 129, such as a horizontal plane.

The flaps 118 in each of the groups 124 and 126 are movable together, but each group 124 and 126 of flaps 118 are movable independently of each other. Operation of the flaps 118 is described in more detail below. In the illustrated example, the flaps 118 in the first and second groups 124 and 126 are consecutively arranged. That is, in some implementations, flaps 118 of one of the groups 124 and 126 are not interposed with the flaps 118 of the other of the groups 124 and 126. Arranging the groups 124 and 126 of flaps 118 in this way provides for controlling an orientation of the flaps 118 over a range of motion of the flaps 118 so as to avoid material accumulation within the grate assembly 106.

Figure 4:
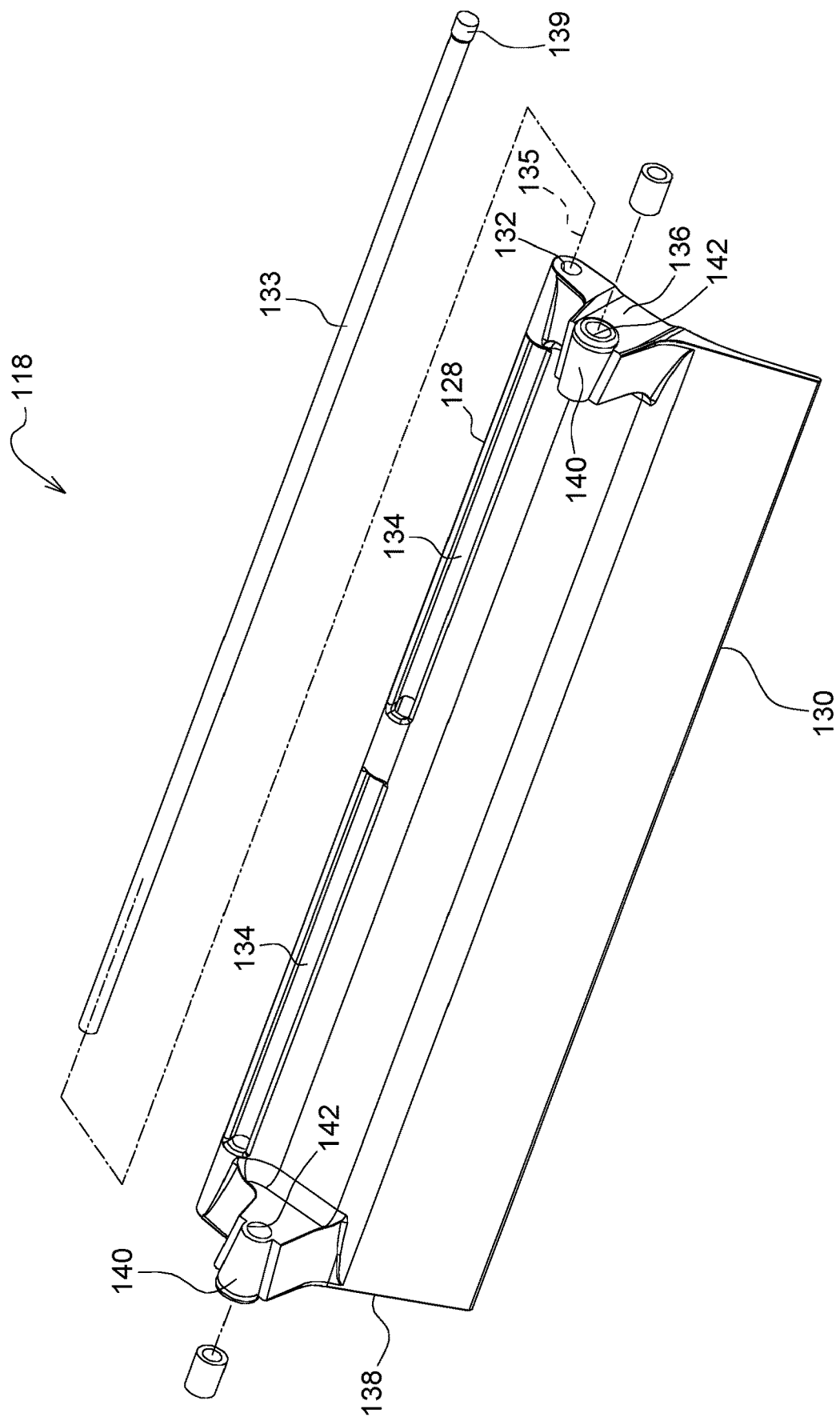
FIG. 4 is an oblique view of an example flap of a crop processing system, according to some implementations of the present disclosure.

FIG. 4 is an oblique view of an example flap 118. The flap 118 includes a leading end 128 that is pivotably coupled to a grate, e.g., grate 120 or 122, and a trailing end 130 opposite the leading end 128. A bore 132 is formed through the leading end 128. The bore 132 receives a shaft 133 on which the flap 118 pivots. The flaps 118 pivot about an axis 135 defined by each shaft 133. In some implementations, the bore 132 is entirely enclosed. In other implementations, the flap 118 includes one or more openings 134 that intersect with the bore 132. The shaft is viewable through the openings 134. Although two openings 134 are illustrated, in other implementations, additional or fewer openings 134 are included. The trailing end 130 is extends from the grate when the flap 118 is connected thereto. The flaps 118 also include opposing sides 136 and 138 and outwardly extending tabs 140. Openings 142 are formed in the tabs 140 and are used to connect the flaps 118 to a link of a linkage, described in more detail below. The linkage is operable to pivot the flaps 118 about the respective shafts 133 passing through the respective leading ends 128 of the flaps 118. Further, in some implementations, the flaps 118 have a generally curved transverse cross-sectional shape defined by a plane disposed perpendicularly to the axis 135.

Figure 5:
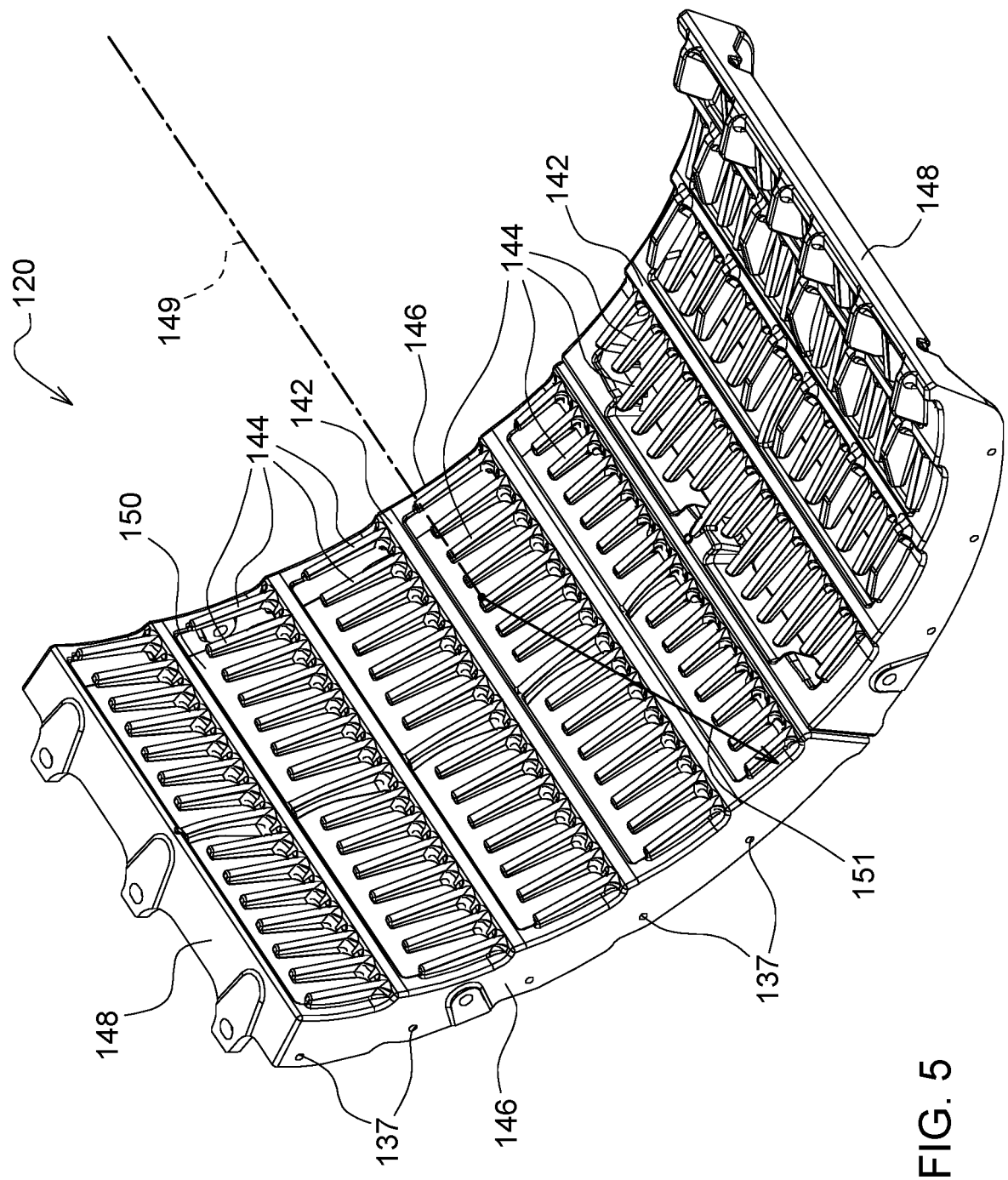
FIG. 5 is an oblique view of an example grate of a grate subassembly, according to some implementations of the present disclosure.

As shown in FIG. 5, the shaft 133 is received into openings 137 formed in the opposing sidewalls 146 of the grates 120 and 122, as described in more detail below. Referring again to FIG. 4, in some instances, the shaft 133 includes an end portion 139 that, when received into the opening 137, forms an interference fit, thereby fixing a position of the shaft 133 relative to the grate 120 or 122. As a result, the flaps 118 pivot on and relative to the shaft 133. In some implementations, the shaft 133 includes end portions 139 at both ends that form an interference fit with the grate 120 or 122 when inserted into the openings 137. In other implementations, the shaft 133 may be rotatable relative to the grate 120 or 122. For example, the shaft 133 may be rotatably relative to the grate 120 or 122 using one or more bearings. Further, the shaft 133 may have a fixed orientation relative to the flap 118 when assembled thereto. Thus, in some implementations, the flap 118 and shaft 133 are pivotable relative to the grate 120 or grate 122.

Figure 6:
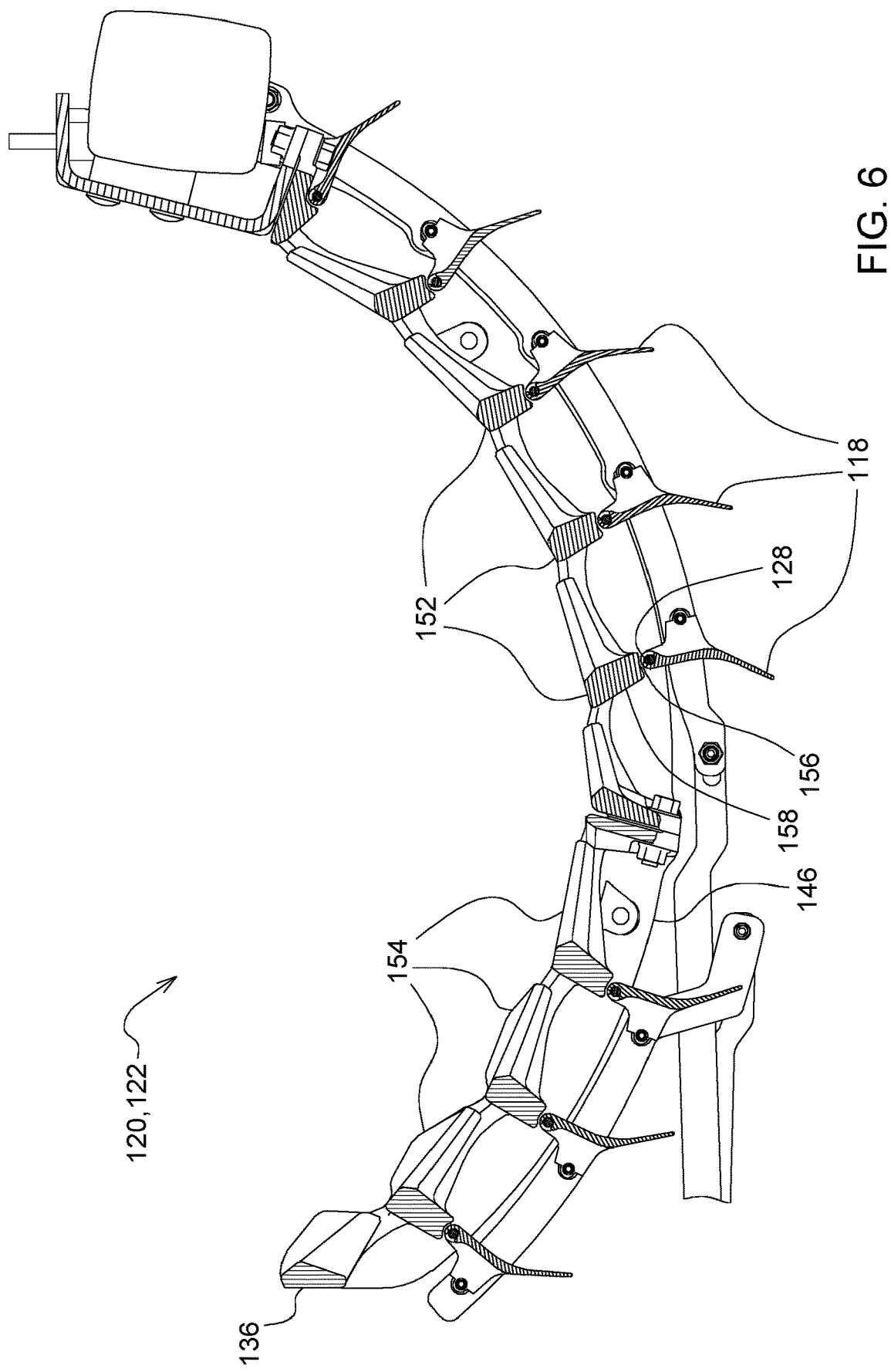
FIG. 6 is a cross-sectional view of an example grate of grate subassembly, according to some implementations of the present disclosure.

FIG. 5 shows the grate 120, which is representative of grate 122. FIG. 5 shows the grate 120 with an end portion 144 attached. An actuator, such as actuator 146 (as shown in FIG. 6) is coupled to the end portion 144. In some implementations, the portion of the grate 120 represented by the end portion 144 is integrally formed with the grate 120 as opposed to being a separable component. The grate 120 includes sidewalls 146 and end walls 148 extending between the sidewalls 146. In some implementations, the sidewalls 146 are parallel to each other, and, in some implementations, the end walls 148 are parallel to each other. In other implementations, the sidewalls 146 are not parallel to each other, and, in some implementations, the end walls 146 are not parallel to each other.

The sidewalls 146 are curved so as to follow a contour, e.g., a cross-sectional circular shape, of the rotors 102 and 104. The grate 120 defines a longitudinal axis 149. The sidewalls 146 have an arc shape, and at least a portion of the arc shape of the sidewalls 146 is defined by a radius 151 extending from the central longitudinal axis 149. In some instances, the central longitudinal axis 149 aligns with a longitudinal axis of a rotor, such as rotor 115. Thus, in some implementations, the radius 151 extends from the longitudinal axes of the rotors, such as the longitudinal axes 119 and 121 of respective rotors 102 and 104, as shown in FIG. 3. In some implementations, the grate 122 may be similarly configured. Thus, in some instances, a longitudinal axis defined by the grate 122 may align with a longitudinal axis of a rotor that is adjacent thereto, such as rotor 117. Further, a radius extending from the longitudinal axis defined by the grate 122 defines at least a portion of an arc shape of the sidewalls of the grate 122. The sidewalls 146 and the end walls 148 define an opening 150 through which crop material passes during operation of the crop processing system 100. The grate 120 include a plurality of crossbars 152 extending across the opening 150 between the sidewalls 146. A plurality of grate fingers 154 extend from each of the crossbars 152.

Figure 7:
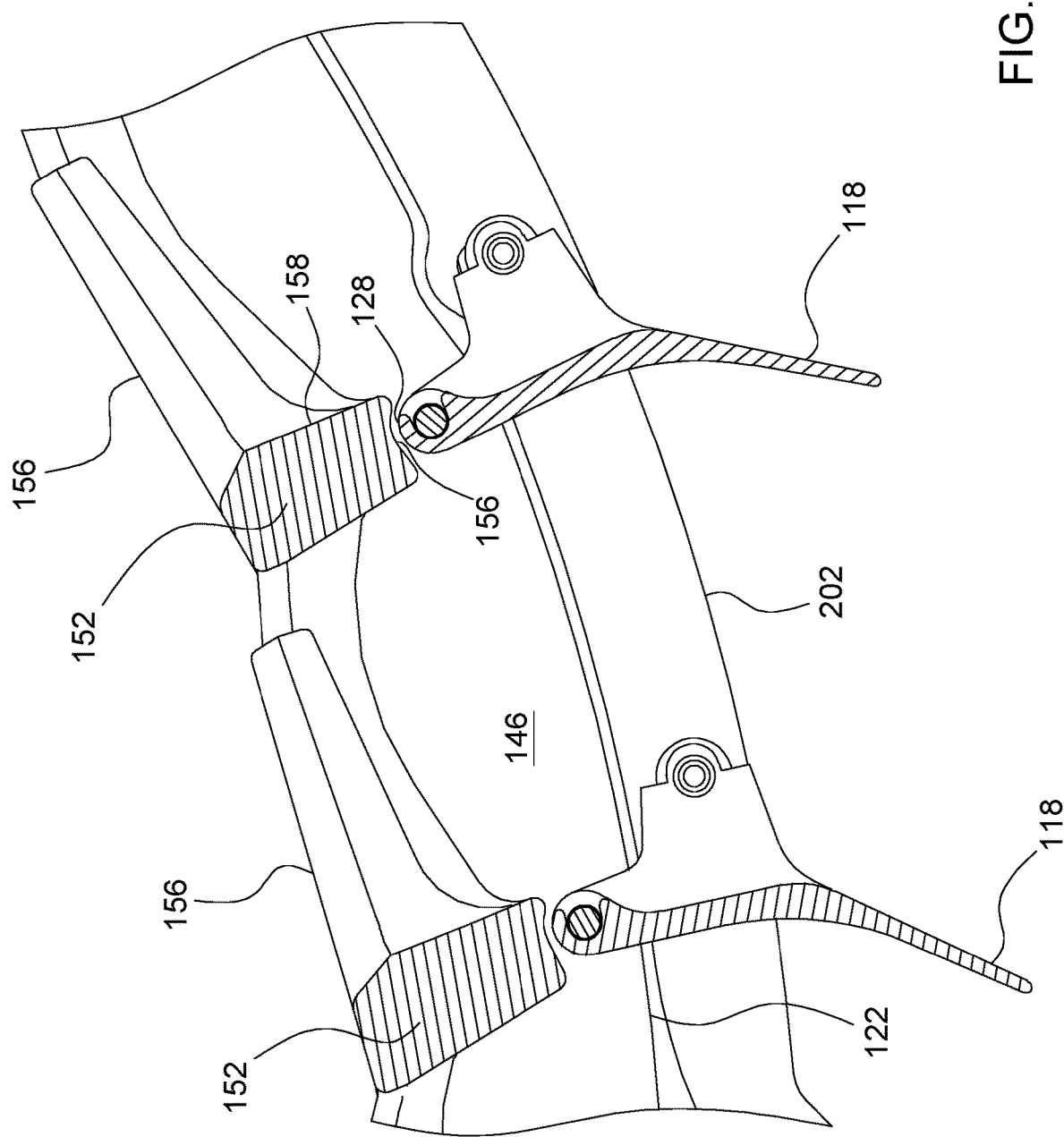
FIG. 7 is a detail view of a portion of the grate of FIG. 6.

FIG. 6 is a cross-sectional view of the grate 122 and is representative of grate 120. As shown in FIG. 6, a flap 118 is pivotably connected at an end 158 of each crossbar 152. In the illustrated example, the crossbar 152 defines a groove 156 at a distal end 158 thereof. In some implementations, the groove 156 has a curved shape that conforms to a shape of the leading end 128 of the flap 118, as shown in more detail in FIG. 7. Thus, in some instances, the leading end 128 of the flap 118 is received into and nests in the groove 156 of the crossbar 152. Nesting of the flap 118 into the groove 156 reduces locations where crop material passing through the grate 120 can become lodged and collect. FIG. 7 is a detail view of the grate 122 showing flaps 118 nested within the grooves 156 formed in the distal end 158 of the crossbars 152. The collection of crop at such locations reduces a size of the opening of the grate, particularly between the crossbars 152 and the grate fingers 154. Consequently, the collected crop reduces the efficiency of the crop processing system 100 by reducing an amount of crop material permitted to pass through the grate 120 (e.g., a rate at which crop material passes through the grate). This reduced efficiency increases operating costs of the crop processing system 100. By eliminating or reducing the locations where crop material can collect, such as by the nesting of the leading end 128 of the flaps 118 in the grooves 156 of the crossbars 154, efficiency of the crop processing system 100 increase and an operating cost thereof decreases.

Figure 8:
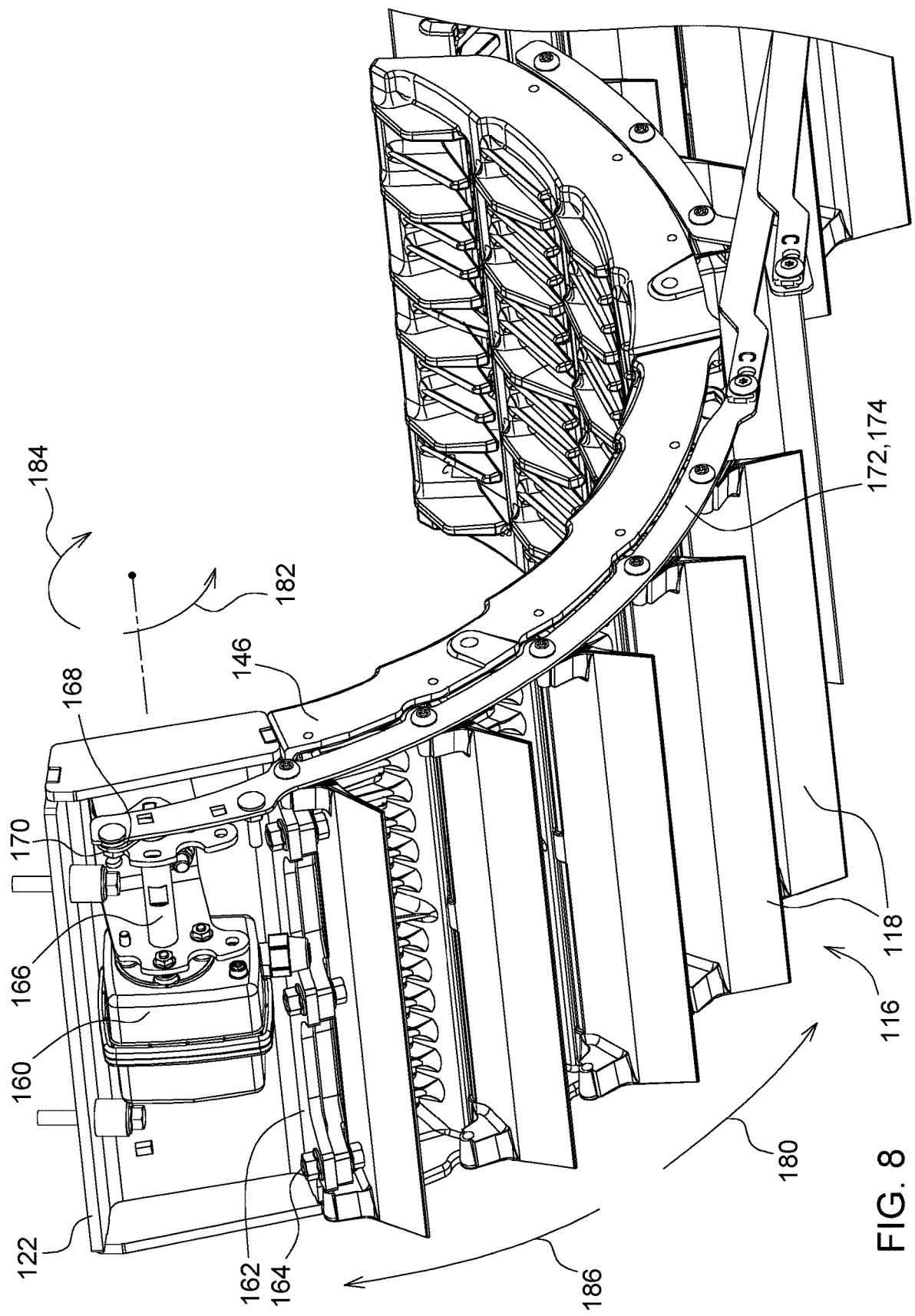
FIG. 8 is an oblique view of an example grate subassembly, according to some implementations of the present disclosure.

FIG. 8 is an oblique view of the grate subassembly 114 and is representative of the grate subassembly 116. An actuator 160 is attached to the grate 120. The actuator 160 is coupled to the grate 122, in this example, to the end portion 144 of the grate 120 by a bracket 162. The bracket 162 is coupled to the grate 120 with fasteners 164, such as bolts, screw, rivets, or other types of fasteners. In the illustrated example, the actuator 160 is an electric rotary actuator and includes a shaft 166 that is rotatable to cause pivoting of a portion of the flaps 118 on the grate 122 as well as a portion of the flaps on grate 120. In other implementations, the actuator 162 may be another type of actuator, such as a linear actuator. Further, in other instances, the actuator 162 may be powered in other ways, such as hydraulically or pneumatically.

The shaft 166 includes an arm 168 disposed at a distal end 170 thereof. The arm 168 is pivotably coupled to a linkage 172. The linkage 172 includes a first link 174, a second link 176 (shown in FIG. 3), and a third link 178 (also shown in FIG. 3) connecting the first link 174 and the second link 176. The first link 174 is pivotably coupled to the arm 168 and pivotably coupled to the flaps 118 in the first group 124, as shown in in FIG. 3. The first link 174 is coupled to the flaps 118 at a tabs 140 of each flap 118. In this way, the first link 174 is able to apply a moment to the flaps 118 about the respective axes 135 in response to movement of the first link 174, causing the flaps 118 in the first group 124 to pivot about the respective axes 135. In response to rotation of the shaft 166 in the direction of arrow 182, the first link 174 is moveable in a direction of arrow 180 along the grate 122, causing the flaps 118 in the first group 124 to pivot about respective axes 135 in the direction of arrow 182. Similarly, rotation of the shaft 166 in the direction of arrow 184 displaces the first link 174 in the direction of arrow 186, causing rotation of the flaps 118 in the first group 124 about the respective axes 135 in the direction of arrow 184.

Figure 9:
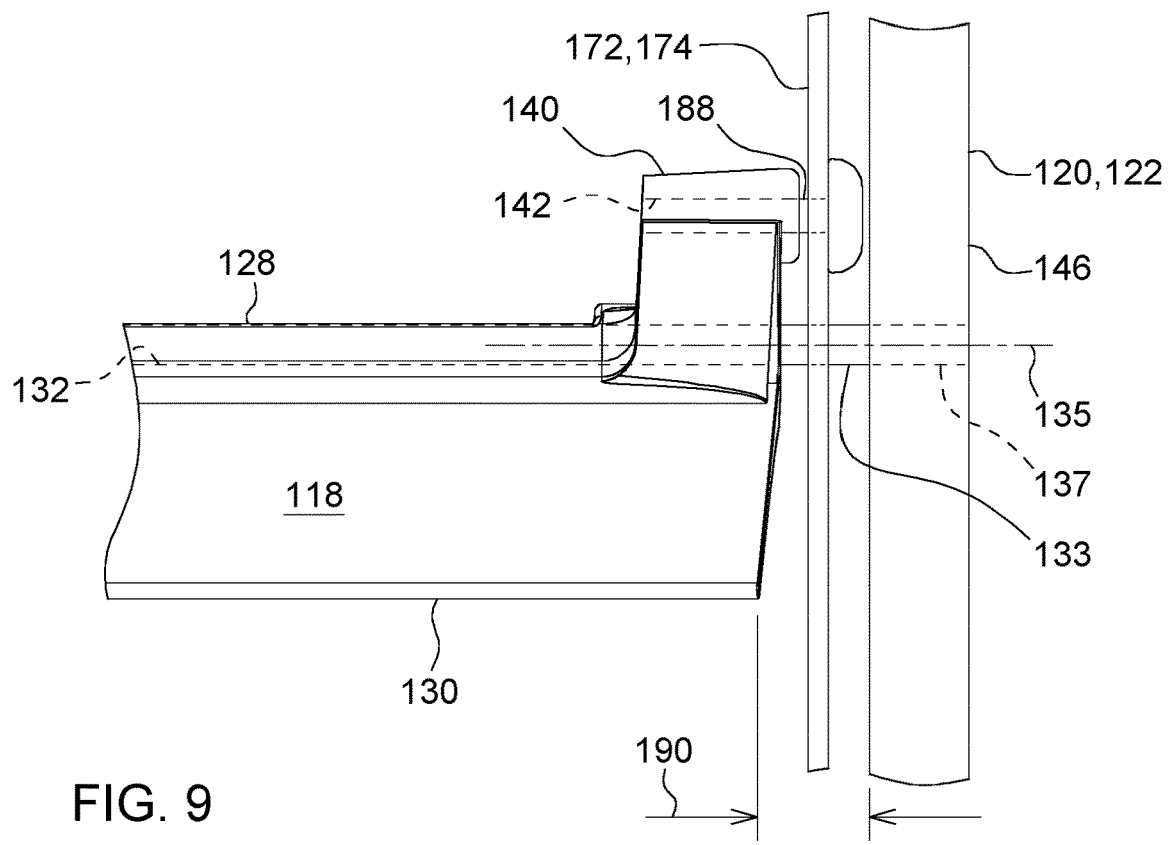
FIG. 9 is a detail view of a portion of an example grate subassembly, according to some implementations of the present disclosure.
Figure 10:
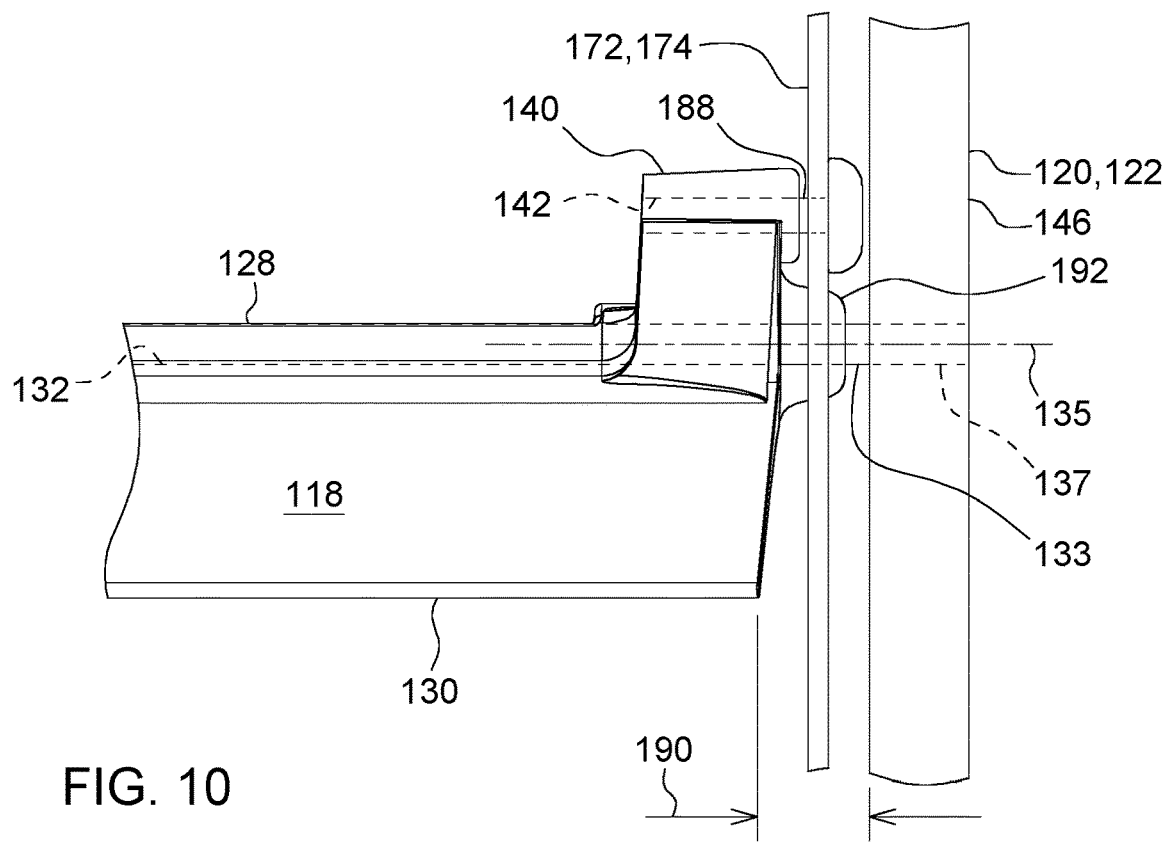
FIG. 10 is detail view of a portion of another example grate subassembly, according to some implementations of the present disclosure.

FIGS. 9 and 10 are detail views of different implementations of the grate subassembly 116 shown in FIG. 7. FIGS. 9 and 10 are detail views showing connection of a flap 118 to a sidewall 136 of the grate 122 and connection of the first link 174 of the linkage 172 to the illustrated flap 118. Referring first to FIG. 9, as described earlier, the flap 118 pivots about axis 135 defined by the shaft 133. The shaft 133 is received into openings 137 formed in the sidewalls 136 of the grate 122. The shaft 133 extends through a bore 132 formed in the leading end 128 of the flap 118. The first link 174 of the linkage 172 is pivotably connected to the flap 118 by a pin 188. As shown, the first link 174 is disposed in a space 190 defined between a side (e.g., side 136) of the flap 118 and the sidewall 146 of the grate 122. Consequently, no parts of a flap 118 extends into the space 190 and no other flap or part of another flap is positioned in the space 190. By arranging the grate subassembly 116 in this way and, particularly, by arranging the linkage 172 in the space 190 between the flaps 118 and the sidewall 146, the number of parts of the grate subassembly 116 is reduced. Consequently, the cost of the grate subassembly 116 is similarly reduced.

Referring to FIG. 10, a portion 192 of the leading end 128 of the illustrated flap 118 that extends beyond the side 136 of the flap 118. In this example, the portion 192 extends into the space 190 between the side 136 of the flap 118 and the sidewall 146 of the grate 122. In this example, the portion 192 is present in part of the space 190 that exists between the first link 174 and the sidewall 146. However, the remainder of the flap 118 apart from the portion 192 (and, particularly, the trailing end 130) is arranged such that the first link 174 is disposed between the side 136 of the flap 118 and the sidewall 146 of the grate 122. This implementation also reduces the number of parts and associated cost of the grate subassembly 116 because, apart from the portions 192 of the flaps 118, no other flaps or parts of other flaps are present in the space 190. By providing the linkage 172 adjacent to a sidewall 146 of the grate 120 or 122 as described above, a linkage that splits or otherwise divides the flaps 118 into separate portions is avoided, thereby reducing the number of parts and complexity of the grate subassemblies 114 or 116 and the associated cost.

The arrangement described above in the context of FIGS. 9 and 10 is not limited to the first link 174. Rather, the second and third links 176 and 178 are similarly positioned relative to the flaps 118 and the sidewall 146 of the grates 120 or 122.

Figure 11:
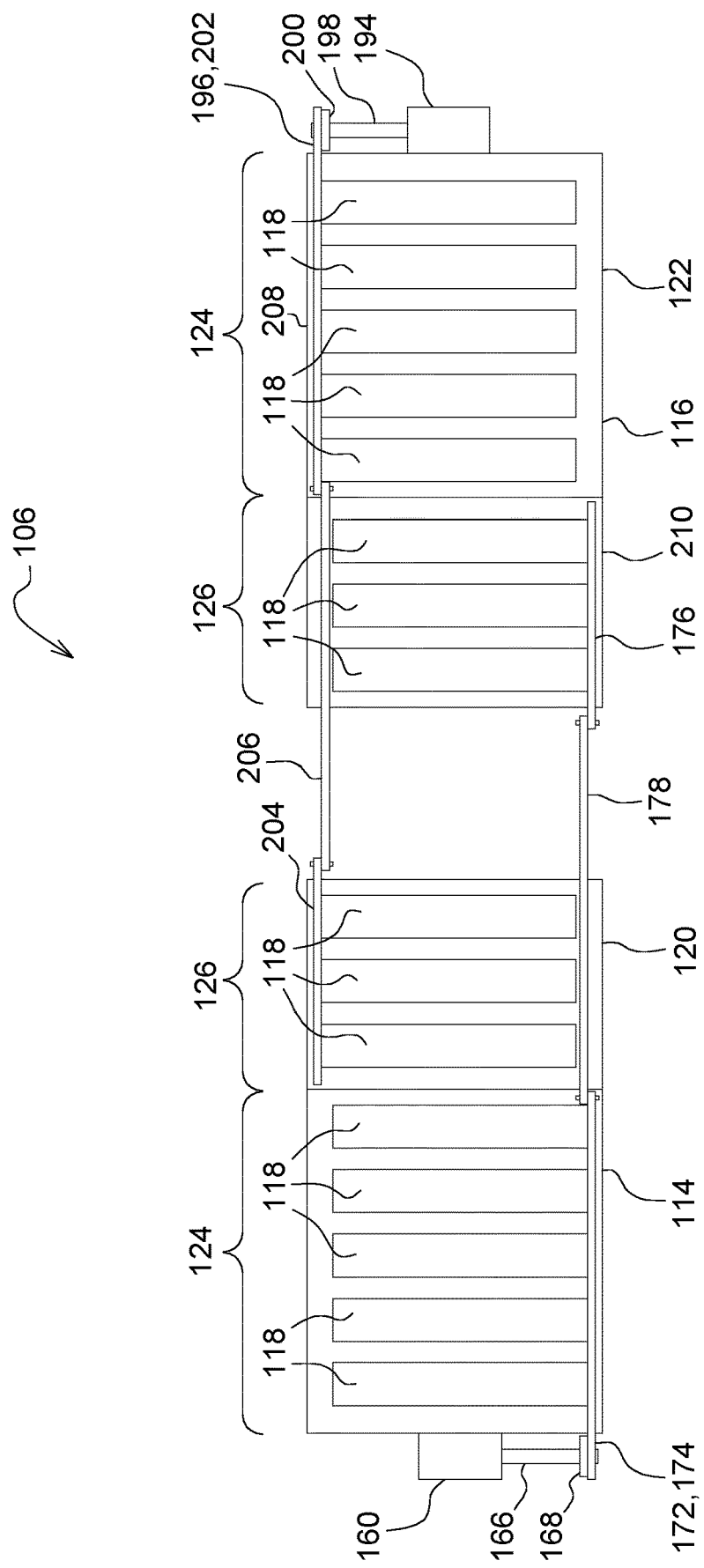
FIG. 11 is a schematic view of an example grate assembly, according to some implementations of the present disclosure.

FIG. 11 is a schematic view of the example grate assembly 106. As explained earlier, the grate assembly 106 includes grate subassemblies 114 and 116. The grate subassembly 114 includes an actuator 194 that is similar to the actuator 160 and a linkage 196 that is similar to linkage 172. The linkage 196 is coupled to the actuator 194 via a shaft 198 that is rotatable in response to actuation of the actuator 194. The linkage 196 is connected to an arm 200 of the shaft 198. The linkage 196 includes a first link 202, a second link 204, and a third link 206 that connects the first link 202 and the second link 204. The first link 202 is coupled to the actuator 194 (such as via the arm 200 of the shaft 198) and is pivotably coupled to the flaps 118 of a first group of flaps 124 of the grate subassembly 116, and the second link 204 is pivotably coupled to the second group 126 of flaps 118 provided on the grate assembly 114. Thus, actuation of the actuator 194 moves the linkage 196, which, in turn, causes the flaps 118 of the first group 124 of the grate subassembly 116 and the flaps of the second group 126 of the grate subassembly 114 to move in unison. Further, these groups of flaps 118 pivot in the same rotational direction in response to movement of the linkage 196. Actuation (e.g., rotation) of the actuator 194 in a first direction causes pivoting of the coupled flaps 118 in a first rotational direction, and actuation (e.g., rotation) of the actuator 194 in a second direction (e.g., opposite the first direction) causes pivoting of the coupled flaps 118 in a second rotational direction, opposite the first rotational direction.

Similar to the grate subassembly 116, the linkage 172 of the grate subassembly 114 is pivotably coupled to the second group 126 of flaps 118 of the grate subassembly 116 in addition to the first group 124 of flaps 118 of the grate subassembly 114. As a result, actuation of the actuator 160 rotates the shaft 166, which, in turn, moves the linkage 172 to cause pivoting of the flaps 118 of the first group 124 of the grate subassembly 114 and the second group 126 of the grate subassembly 116. Further, the flaps 118 in both groups are pivoted simultaneously in the same rotational direction in response to operation of the actuator 160. Therefore, the actuator on the grate subassemblies 114 and 116 is operable to pivot a portion of the flaps 118 on both grate subassemblies 114 and 116. Actuation (e.g., rotation) of the actuator 160 in a first direction causes pivoting of the coupled flaps 118 in a first rotational direction, and actuation (e.g., rotation) of the actuator 160 in a second direction (e.g., opposite the first direction) causes pivoting of the coupled flaps 118 in a second rotational direction, opposite the first rotational direction.

As explained earlier, the linkage 196 is provided between the flaps 118 (whether an entirety of all of the flaps 118, as shown in FIG. 9, or all but a portion of the flaps 118, as shown, for example, in FIG. 10) and the sidewall 146 on a first side 208 of the grate assembly 106. The linkage 172 is provided between the flaps 118 (whether an entirety of all of the flaps 118, as shown in FIG. 9, or all but a portion of the flaps 118, as shown, for example, in FIG. 10) and the sidewall 146 on a second side 210 of the grate assembly 106.

In some implementations, one or more linkages similar to linkage 172 or 196 could be used to move the grate fingers 144. For example, in some implementations, the grate fingers 144 associated with a particular crossbar 142 are pivotably connected to pivot about an axis, for example an axis parallel to the respective crossbar 142, and a linkage similar to linkage 172 or 196 is coupled one or more groups of connected grate fingers 144. Thus, actuation of an actuator coupled to the linkage operates to pivot the grate fingers 144 in opposing rotational directions in a manner similar to that described above in the context of the flaps 118.

Figure 12:
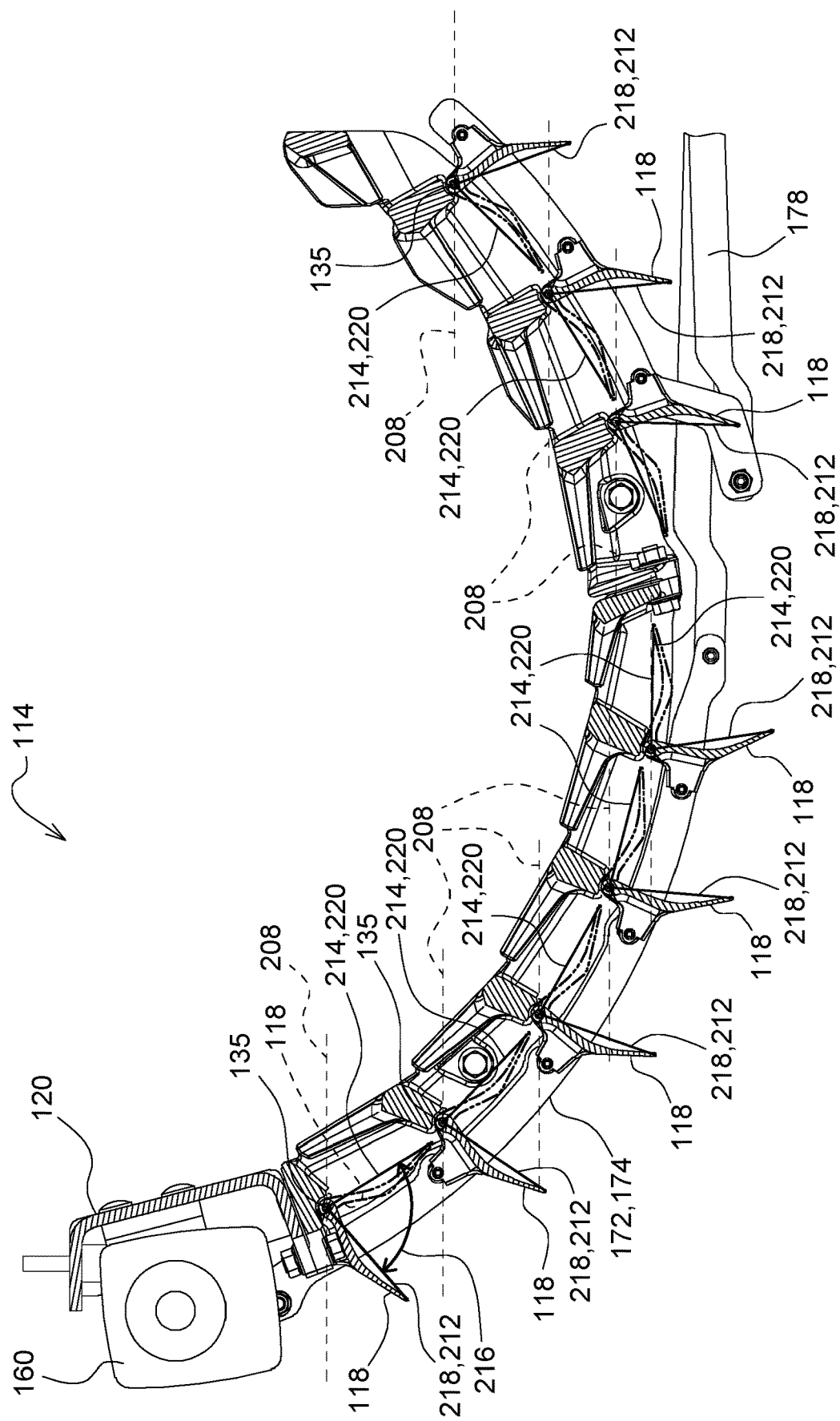
FIG. 12 is a side view of an example grate subassembly, according to some implementations of the present disclosure.

FIG. 12 is a side view of the grate subassembly 114. Horizontal lines 208 are included, and each horizontal line 208 passes through the axis 135 for each flap 118. The horizontal lines 208 are parallel to level ground on which a combine harvester (such as combine harvester 10) that includes the grate subassembly 114 is sitting. Thus, the horizontal lines 208 are a proxy representing level ground. In some implementations, the horizontal lines 208 may be defined by a plane passing through the axes 135 that is intersected by a vertical plane (e.g., a plane perpendicular to level ground). In some instances, the combine harvester may include a panel or floor, such as panel 40 shown in FIG. 1, that is oriented parallel with the ground on which the combine harvester sits. Consequently, when the combine harvester is on level ground, the panel or floor is oriented parallel with the level ground. In such instances, the horizontal lines 208 are parallel to the panel or floor of the combine harvester as well as to the level ground.

Each of the flaps 118 is illustrated at two different positions (i.e., a fully open position 212 and a fully closed position 214) that correspond to ends of a range of motion 216 that can be imparted to the flaps by the respective actuators 160 and 194. A slope of the flaps 118 at the fully open position 212 is represented by a line 218, and a slope of the flaps 118 at the fully closed position 214 is represented by a line 220. The lines 218 and 220 extend from the axes 135 to distal ends 221 of the flaps 118. As illustrated in FIG. 12, both lines 218 and 220 for each flap 118 remains below the horizontal line 208. Consequently, the distal end 221 of each flap 118 remains below the respective horizontal line 208 over the entire range of motion 216. Thus, the flaps 118 do not intersect the respective horizontal line 208 at any position over the range of motion 216. As a result, even in the fully closed position 212, the flaps 118 have a downwardly slanted orientation relative to the horizontal lines 208 and, as a result, do not create locations within the opening 150 of the grates 120 and 122 adjacent to the flaps 118 that are prone to accumulate crop material passing through the crop processing system 100. In the context of a combine harvester, such as combine harvester 10, positioned on level ground in a conventional orientation to allow the combine harvester to operate as intended, the downward slopes of the flaps 118 allows crop material passing through to maintain a downward component of movement in response to gravity.

With the downward slope of the flaps 118 no matter what position the flaps 118 have within the range of motion 216, the crop material is not required to move in a direction opposite gravity in order to pass by a flap 118 of the grate subassemblies 114 and 116. Thus, the risk of plugging of a grate subassemblies 114 and 116 with crop material is reduced. With reduced plugging, the efficacy and the efficiency of the threshing and separation of the crop material by the crop processing system 100 is improved and, as such, operating costs of the crop processing system is decreased.

Figure 13:
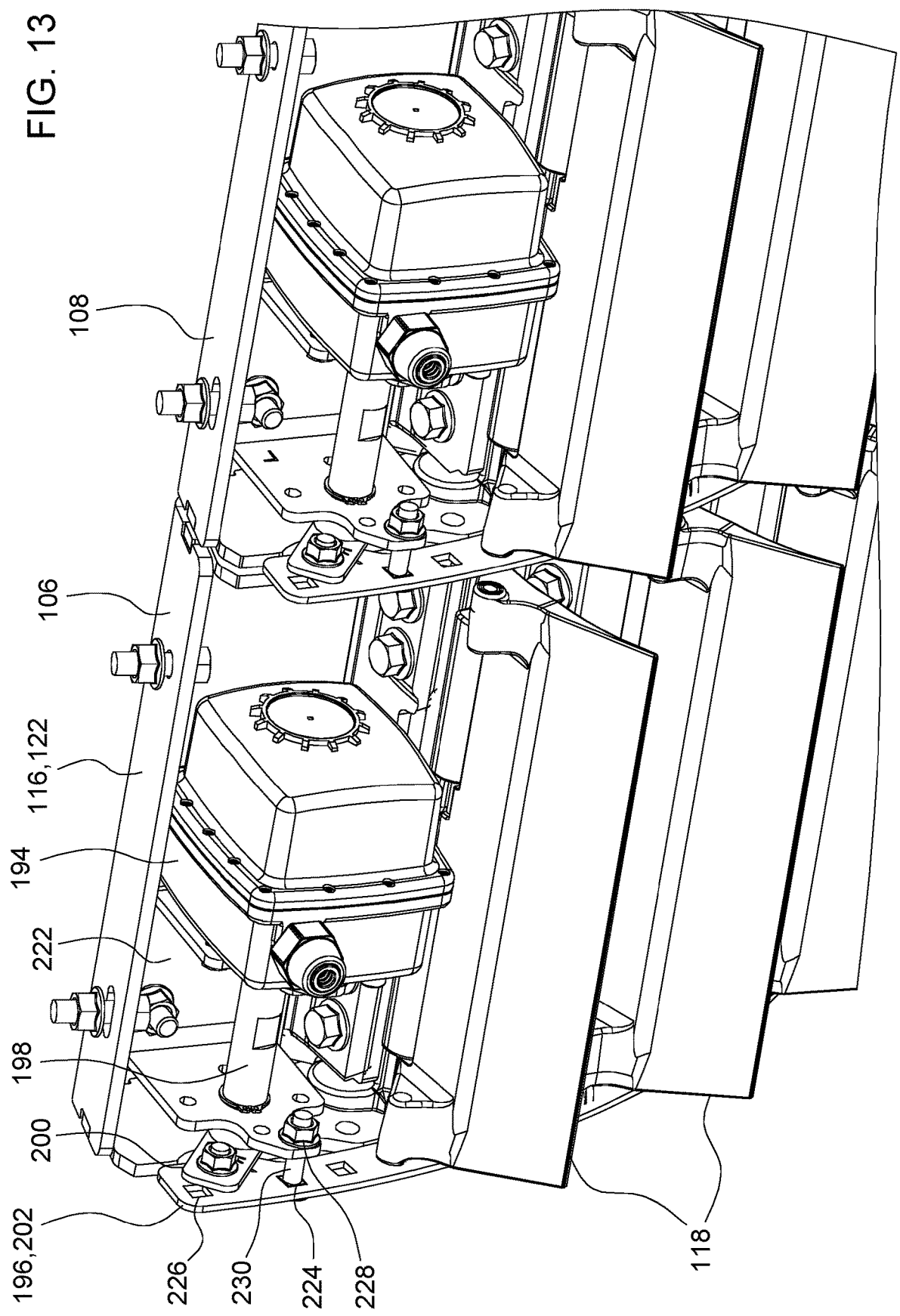
FIG. 13 is a detail view of a portion of an example grate subassembly, according to some implementations of the present disclosure.
Figure 14:
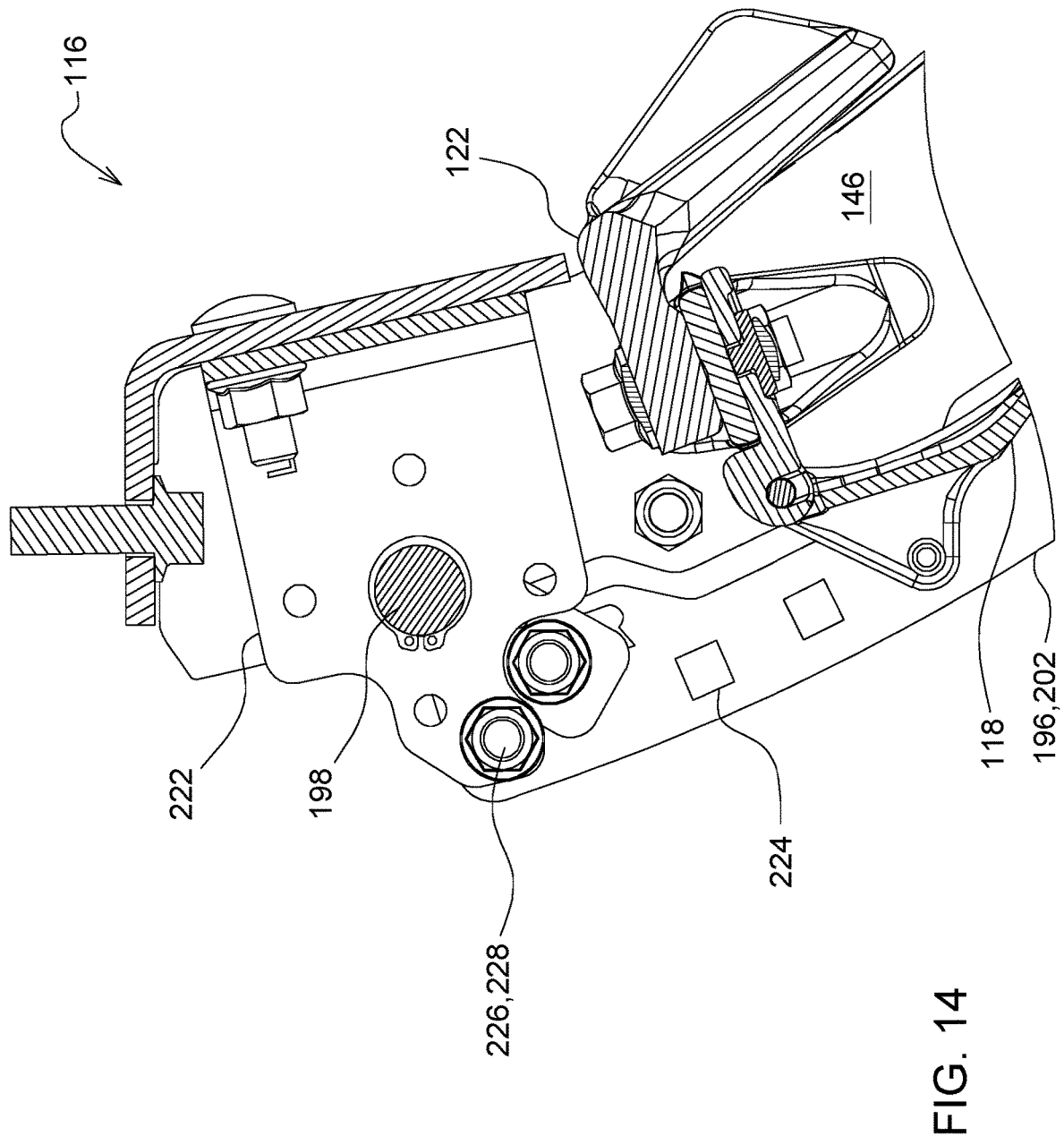
FIG. 14 is a cross-sectional side view of the grate subassembly of FIG. 13 with a linkage locked in a first position.
Figure 15:
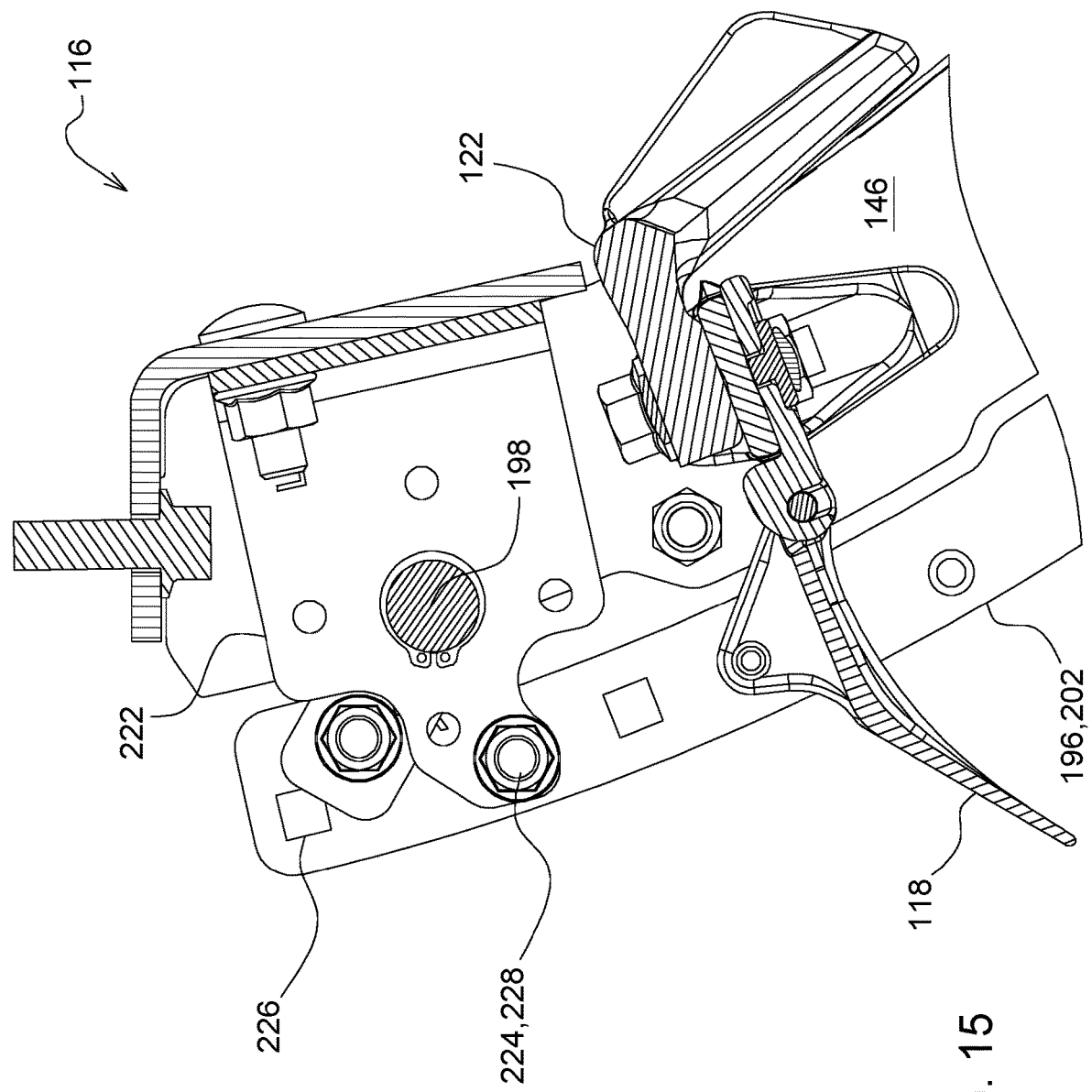
FIG. 15 is a cross-sectional side view of the grate subassembly of FIG. 13 with the linkage locked in a second position.

FIG. 13 is a detail view of a portion of the grate subassembly 116 near the actuator 194. As described earlier, the shaft 198 includes an arm 198 that is pivotably coupled to the first link 202 of linkage 196. The shaft 198 extends through and is supported by a bracket 222. Apertures 224 and 226 are formed in the first link 202, and an aperture 228 is formed in the bracket 222. As shown in FIG. 14, when the linkage 196 is moved into a first position in which the flaps 118 coupled thereto are positioned in the fully open position, the aperture 228 formed in the bracket 222 aligns with the aperture 224 formed in the first link 202. The linkage 196 is locked into the first position with a fastener 230, such as a pin, bolt, or screw, that passes through the aligned apertures 228 and 224. Similarly, as shown in FIG. 15, when the linkage 196 is moved into the second position in which the flaps 118 coupled thereto are positioned in the fully closed position, the aperture 228 formed in the bracket 222 aligns with the aperture 226 formed in the first link 202. The linkage 196 is locked in the second position with a pin or other fastener is passed through the aligned apertures 228 and 226. The linkage 172 of the grate assembly 114 is lockable into the first position or the second position in a similar manner. Although two apertures 224 and 226 are included on the first link 202 in the illustrated example, in other implementations, additional or fewer apertures may be provided so as to provide additional or fewer positions into which the flaps may be secured.

The ability to lock the linkage 196, 172, or both into the first position or the second position is beneficial, such as when the associated actuator 194 or 160 ceases to function or when another problem exist that prevents movement of the linkage 196 or 172 in response to the associated actuator 194 or 160. In this way, the crop processing system 100 can be configured with the flaps 118 in the fully open position or the fully closed position (or any other desired position of the flaps 118 that corresponds to the alignment of the aperture 228 with the associated apertures 224 and 226), thereby allowing the crop processing system 100 to operate and the combine harvester that includes the crop processing system 100 to continue harvesting.

Without in any way limiting the scope, interpretation, or application of the claims appearing below, a technical effect of one or more of the example implementations disclosed herein is the ability to alter a position of flaps or grate fingers of a crop processing system without having to stop a harvesting operation. Alteration of a position of one or more flaps can be performed by actuation of an actuator in response to an input by an operator, such as when the operator is located in the cab of a combine harvester during a harvesting operation. As a result, a time to perform a harvesting operation is reduced, thereby reducing labor and other operating costs. Another technical effect of one or more of the example implementations disclosed herein is the reduction of the number of parts of a crop processing system, resulting in a crop processing system with reduced complexity and a reduced cost. Another technical effect of one or more of the example implementations disclosed herein is incorporating an actuator for altering a position of flaps or grate fingers on a grate subassembly. This arrangement increases the modularity of the grate subassemblies and reduces maintenance costs associated with servicing or replacing the grate assemblies.

While the above describes example implementations of the present disclosure, these descriptions should not be viewed in a limiting sense. Rather, other variations and modifications may be made without departing from the scope and spirit of the present disclosure as defined in the appended claims.

What is claimed is:

1. A grate assembly of a crop processing system for an agricultural machine comprising:
   a grate configured to be disposed adjacent to a rotor, the grate comprising:
   a first sidewall;
   a second sidewall offset from the first sidewall; and
   an opening defined between the first sidewall and the second sidewall;
   a plurality of flaps pivotably coupled to the grate, each flap of the plurality of flaps comprising:
   a first end;
   a second end disposed opposite the first end, the first end disposed adjacent to the first sidewall of the grate;
   a leading end, the flap pivotable about a pivot axis passing along the leading end; and
   a trailing end freely extending from the leading end;
   a movable linkage disposed between at least a portion of the first ends of the plurality of flaps and the first sidewall, the movable linkage coupled to at least one of the flaps of the plurality of flaps, the movable linkage movable between a first position and a second position to pivot the at least one of the flaps of the plurality of flaps over an angular range;
   a space disposed between the movable linkage and the first sidewall being free of a trailing end of any flap; and
   a plurality of crossbars extending through the opening between the first sidewall and the second sidewall, the plurality of crossbars distributed along a length of the first sidewall and the second sidewall,
   wherein the leading end of each of the plurality of flaps is pivotably coupled at an end of a respective crossbar of the plurality of crossbars,
   wherein at least one of the plurality of crossbars includes a recess, and wherein an end of the flap of the plurality of flaps corresponding to the at least one crossbar that includes the recess nests in the recess.

2. The grate assembly of claim 1, wherein the plurality of flaps extends between the first sidewall and the second sidewall.

3. The gate assembly of claim 1, wherein at least one of the plurality of flaps comprises a tab, and wherein the movable linkage is pivotably coupled to the tab.

4. The grate assembly of claim 1, further comprising a pivot pin extending along the pivot axis, the pivot pin including a head,
   wherein a flap of the plurality of flaps is pivotable on the pivot pin about the pivot axis,
   wherein at least one of the first sidewall and the second sidewall comprises an opening,
   wherein the head of the pivot pin is received into the opening to form an interference fit.

5. The grate assembly of claim 1, wherein the first sidewall and the second sidewall define a curvature.

6. The grate assembly of claim 1, wherein the plurality of flaps is pivotably coupled to the first sidewall and the second sidewall.

7. The grate assembly of claim 1, wherein the grate comprises one of a separator grate and a concave grate.

8. The grate assembly of claim 1, wherein the grate comprises a first grate and wherein the movable linkage is configured to be pivotably coupled to at least one flap pivotably coupled to a second grate.

9. A combine harvester comprising:
   a body;
   traction components configured to transport the body over the ground; and
   a crop processing system disposed in the body, the crop processing system comprising:
   a first rotor rotatable about a first longitudinal axis; and a grate assembly disposed adjacent to the first rotor and operable, in cooperation with the first rotor, to process harvested crop material, the grate assembly comprising:
a first grate comprising:
a first sidewall;
a second sidewall offset from the first sidewall; and
an opening defined between the first sidewall and the second sidewall;
a plurality of flaps pivotably coupled to the first grate, each flap of the plurality of flaps comprising:
a first end;
a second end disposed opposite the first end, the first end disposed adjacent to the first sidewall of the first grate;
a leading end, the flap pivotable about a pivot axis passing along the leading end; and
a trailing end extending from the leading end;
a movable linkage disposed between the at least a portion of the first ends of the plurality of flaps and the first sidewall, the movable linkage coupled to at least one of the flaps of the plurality of flaps, the movable linkage movable between a first position and a second position to pivot the at least one of the flaps of the plurality of flaps over an angular range;
a space disposed between the movable linkage and the first sidewall being free of a trailing end of any flap;
a plurality of crossbars extending through the opening between the first sidewall and the second sidewall, the plurality of crossbars distributed along a length of the first sidewall and the second sidewall,
wherein the leading end of each of the plurality of flaps is pivotably coupled at an end of a respective crossbar of the plurality of crossbars,
wherein at least one of the plurality of crossbars includes a recess, and wherein an end of the flap of the plurality of flaps corresponding to the at least one crossbar that includes the recess nests in the recess.

10. The combine harvester of claim 9, wherein the plurality of flaps extends between the first sidewall and the second sidewall.

11. The combine harvester of claim 9, wherein at least one of the plurality of flaps comprises a tab, and wherein the movable linkage is pivotably coupled to the tab.

12. The combine harvester of claim 9, further comprising a pivot pin extending along the pivot axis, the pivot pin including a head,
wherein a flap of the plurality of flaps is pivotable on the pivot pin about the pivot axis,
wherein at least one of the first sidewall and the second sidewall comprises an opening,
wherein the head of the pivot pin is received into the opening to form an interference fit.

13. The combine harvester of claim 9, wherein the first sidewall and the second sidewall define a curvature.

14. The combine harvester of claim 9, wherein the plurality of flaps is pivotably coupled to the first sidewall and the second sidewall.

15. The combine harvester of claim 9, wherein the first grate comprises one of a separator grate and a concave grate.

16. The combine harvester of claim 9, wherein the crop processing system further comprises a second rotor,
wherein the plurality of flaps comprises a plurality of first flaps,
wherein the grate assembly further comprises:
a second grate disposed adjacent to the second rotor; and
a plurality of second flaps pivotably coupled to the second grate, and
wherein the movable linkage is pivotably coupled to at least one flap of the plurality of second flaps to simultaneously pivot at least one of the first flaps and the at least one of the second flaps.

\* \* \* \* \*